US012784109B2

(12) United States Patent
Levine et al.

(10) Patent No.: US 12,784,109 B2
(45) Date of Patent: Nov. 3, 2026

(54) DATA-DRIVEN ADAPTIVE FINANCIAL GUIDANCE SYSTEM WITH REINFORCEMENT LEARNING OPTIMIZATION

(71) Applicant: InspHIRE IO Corp., New York, NY (US)

(72) Inventors: Benjamin Levine, Seattle, WA (US); Patrick Hendershott, Walnut Creek, CA (US); Laurel Taylor, Napa, CA (US)

(73) Assignee: InspHIRE IO Corp., New York, NY (US)

( * ) Notice: Subject to any disclaimer, the term of this patent is extended or adjusted under 35 U.S.C. 154(b) by 8 days.

(21) Appl. No.: 19/173,561

(22) Filed: Apr. 8, 2025

(65) Prior Publication Data

US 2025/0315893 A1 Oct. 9, 2025

Related U.S. Application Data

(60) Provisional application No. 63/631,901, filed on Apr. 9, 2024.

(51) Int. Cl.

*G06Q 40/06* (2012.01)
*G06F 9/451* (2018.01)
*G06Q 40/02* (2023.01)

(52) U.S. Cl.

CPC ............. *G06Q 40/06* (2013.01); *G06F 9/451* (2018.02); *G06Q 40/02* (2013.01)

(58) Field of Classification Search

CPC ......... G06Q 40/06; G06Q 40/02; G06F 9/451
See application file for complete search history.

(56) References Cited

U.S. PATENT DOCUMENTS

| | | | | |
|---|---|---|---|---|
| 11,915,262 | B2 * | 2/2024 | Gupta | G06Q 30/0249 |
| 2024/0354859 | A1 * | 10/2024 | Scavo | G06Q 40/06 |
| 2025/0348791 | A1 * | 11/2025 | Dan | G06N 3/092 |

FOREIGN PATENT DOCUMENTS

| | | | | |
|---|---|---|---|---|
| AU | 2021289313 | A1 * | 6/2022 | G06N 7/01 |
| EP | 4120171 | B1 * | 9/2023 | G06Q 30/0249 |

OTHER PUBLICATIONS

Ozhamaratli et al.: Heterogeneous Retirement Savings Strategy Selection with Reinforcement Learning, 2023, Entropy, 25, 977, MDPI, pp. 1-35 (Year: 2023).*

* cited by examiner

*Primary Examiner* — Bijendra K Shrestha
(74) *Attorney, Agent, or Firm* — Schwegman Lundberg & Woessner, P.A.

(57) ABSTRACT

A computer-implemented method for managing an individual's financial portfolio to optimize net wealth involves receiving financial data, analyzing the data to determine the user's current financial state, and personalizing a financial guidance plan. The method includes generating tailored financial guidance, implementing a reinforcement learning algorithm to refine the guidance, and providing the guidance through a user interface, for example, such as a website. The method further allows for adjusting the financial guidance plan based on user-inputted financial goals and presenting a visual representation of the individual's financial trajectory. This visual representation includes a graphical chart that displays projected net wealth growth and allows for interaction to simulate changes in financial behavior. The method aims to improve net wealth by optimizing resource allocation among debt reduction, savings, and investments according to the individual's personalized financial plan.

14 Claims, 5 Drawing Sheets

DATA-DRIVEN ADAPTIVE FINANCIAL GUIDANCE SYSTEM WITH REINFORCEMENT LEARNING OPTIMIZATION

RELATED APPLICATIONS

This application claims the benefit of priority to U.S. Provisional Patent Application No. 63/631,901, filed Apr. 9, 2024, entitled "DATA-DRIVEN ADAPTIVE FINANCIAL GUIDANCE SYSTEM WITH REINFORCEMENT LEARNING OPTIMIZATION," which is incorporated herein by reference in its entirety.

TECHNICAL FIELD

The present disclosure relates to financial management software, services, and systems for personalized financial planning and wealth management. More specifically, the present disclosure relates to a computer-implemented method and system that employs advanced data analytics, data mining, and machine learning (e.g., reinforcement learning algorithms) to provide dynamic and tailored financial guidance.

BACKGROUND

Managing personal finances has become increasingly complex, with individuals assuming more responsibility for their long-term financial well-being. The shift from traditional pension plans to self-managed savings and investment strategies has introduced a myriad of choices and risks. Individuals need to navigate a diverse array of financial instruments, each with its own set of rules and implications for wealth accumulation and debt management.

Despite the significant nature of these financial decisions, a lack of financial education persists among the general population. This deficiency often results in less than optimal financial management and can contribute to a continuous cycle of economic challenges. The limitations of traditional advisory services, which might not be accessible or tailored to individual requirements, underscore the need for a system that can democratize access to personalized financial guidance, empowering individuals to make informed decisions for their financial future.

SUMMARY

The present disclosure addresses significant challenges in personal financial management by providing a computer-implemented method for optimizing an individual's financial portfolio to maximize net wealth accumulation. Traditional financial guidance relies on generic rules of thumb, stated preferences rather than revealed preferences, and static recommendations that fail to adapt to changing circumstances. These conventional approaches often lead to suboptimal financial outcomes due to their inability to personalize guidance based on actual financial behaviors and their failure to dynamically adjust to evolving financial situations.

The disclosed system collects comprehensive financial data from users, including income, expenses, debt obligations, savings account balances, investment account details, and historical financial transactions. Unlike conventional systems that rely on self-reported preferences, this system employs advanced data mining techniques to extract revealed preferences from actual financial behaviors, providing a more accurate foundation for financial guidance. The system analyzes transaction data to infer critical parameters such as risk tolerance and time preferences, enabling truly personalized financial recommendations that align with users' actual behaviors rather than what they claim their preferences to be.

The system dynamically optimizes the allocation of resources among debt reduction, emergency savings, and investments based on sophisticated comparative analysis. Rather than recommending fixed amounts for emergency funds as traditional approaches do, the system calculates optimal emergency savings thresholds by analyzing the probability distribution of potential spending shocks specific to the user's financial history. It recognizes the diminishing returns of additional savings beyond certain thresholds—for example, increasing emergency savings from $0 to $1,000 provides significantly more protection against high-interest debt than increasing from $7,000 to $8,000. This understanding allows the system to dynamically adjust savings recommendations based on where the user falls on this utility curve, ensuring sufficient protection while avoiding the opportunity cost of over-saving.

A key innovation of the system is its implementation of a reinforcement learning algorithm that continuously refines financial guidance based on real-world feedback. The algorithm functions as an agent that observes the user's financial state, takes actions by generating recommendations, and receives rewards based on improvements in net wealth or progress toward financial goals. This approach enables the system to adapt to changes in the user's financial behavior, adherence to guidance, and any encountered financial shocks, resulting in approximately 10% better net wealth accumulation than traditional financial advice approaches. The reinforcement learning component represents a significant advancement over conventional financial advisory methods, which typically provide static recommendations without the ability to learn from their effectiveness or adapt based on outcomes.

The system allows users to input specific financial targets, such as desired savings balances by specified future dates, and incorporates these targets as constraints in the financial guidance plan. The system then modifies its recommendations to ensure alignment with these user-defined goals while maintaining optimal resource allocation. Through an interactive visualization component, users can explore different financial scenarios by varying parameters such as debt repayment rates, savings contributions, and investment returns, enabling them to make informed decisions with a clear understanding of the long-term effects of their financial choices.

The system also identifies optimal moments to present financial guidance, such as around paydays when users typically perceive greater financial flexibility and are more receptive to recommendations about saving or investing. This strategic timing of financial guidance delivery significantly increases the likelihood of user engagement and implementation of recommendations. Additionally, the system employs quasi-hyperbolic discounting to model how users value present versus future rewards, recognizing that individuals typically place higher value on immediate rewards compared to delayed ones. This approach allows the system to develop allocation strategies that align with the user's desired time horizons while accounting for their natural tendency toward present bias.

The system is implemented through a comprehensive architecture that includes data collection and integration components, analysis modules for debt, savings, and investments, a personalization engine, and a reinforcement learning component. This technological implementation enables the system to provide accessible, personalized, and dynamic financial guidance that evolves with the user's changing financial circumstances and behaviors, empowering individuals to optimize their financial portfolios and achieve their long-term financial goals.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
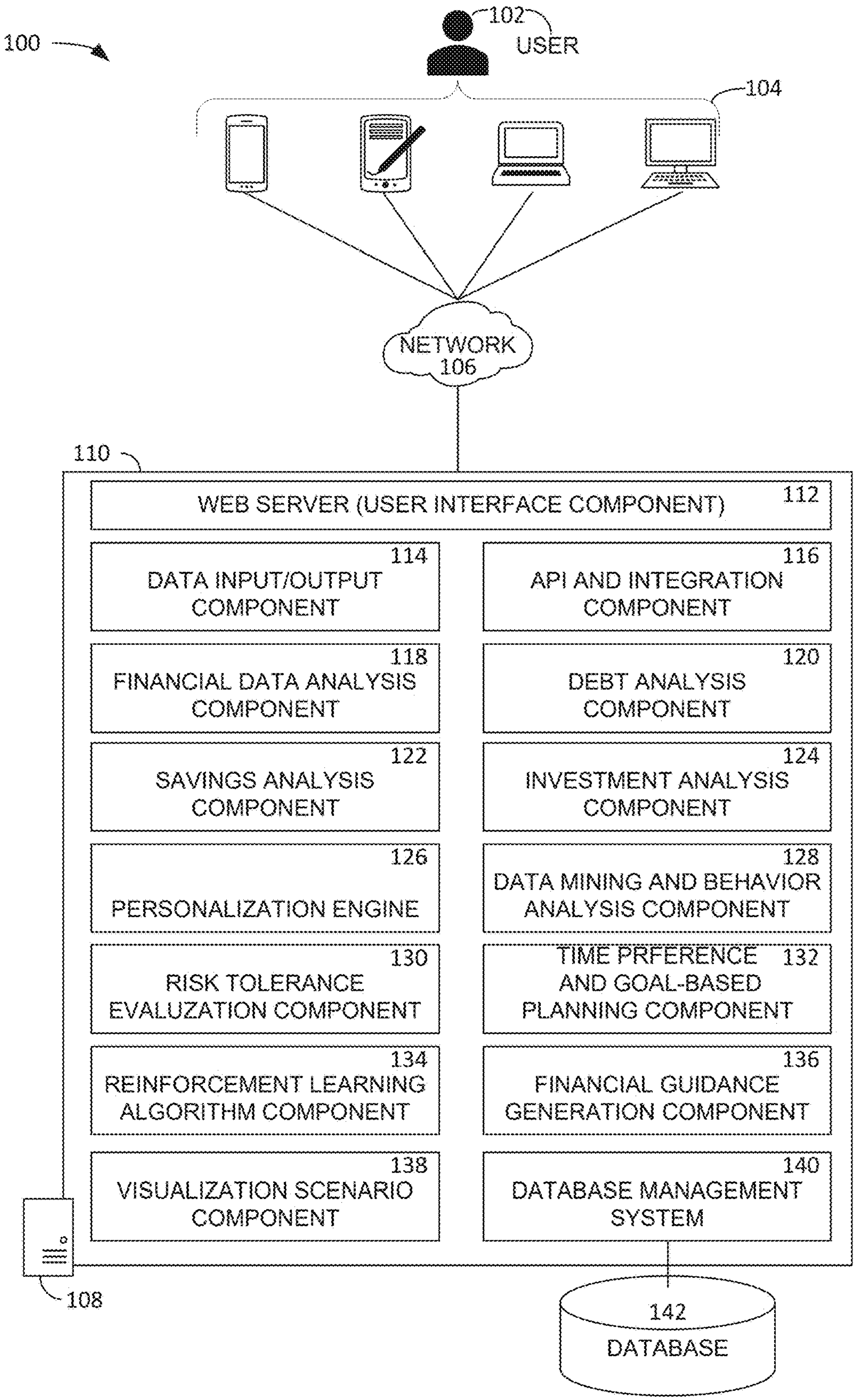
FIG. 1 illustrates a system architecture for a financial guidance platform or system, showing the user interface component (e.g., web server), various analysis components, and the database management system, consistent with some examples.

Described herein are techniques for optimizing individual financial portfolios through automated guidance. More precisely, embodiments of the invention include methods and systems for analyzing personal financial data and generating customized financial plans using data mining and machine learning (e.g., reinforcement learning) techniques. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

Financial stability and wealth accumulation present significant challenges for individuals, particularly in the context of resource allocation between saving, investing, and debt repayment. The complexity of financial decision-making has increased with the shift from employer-managed pension plans to individual-driven retirement savings strategies. The vast array of financial products, such as loans, credit cards, and investment vehicles, further complicates the landscape, necessitating informed decision-making to achieve financial well-being.

Despite the significant nature of financial literacy in navigating these complexities, a substantial portion of the global population lacks an understanding of basic financial concepts. This deficiency can lead to precarious financial situations, such as living paycheck to paycheck or being unprepared for emergency expenses. Inefficient debt management and underutilization of available financial growth opportunities, such as employer-matched retirement contributions, can significantly impede an individual's financial progress and wealth accumulation.

Traditional financial advising has been the primary recourse for individuals seeking to manage their finances effectively. Financial advisors evaluate personal financial situations, develop customized plans, and adjust these plans as circumstances change. Yet, this model has shortcomings. Accessibility and scalability issues often prevent individuals from receiving personalized advice, and the one-size-fits-everyone nature of traditional financial guidance might not align with an individual's distinct financial goals and circumstances.

Conventional approaches to financial guidance rely heavily on generic rules of thumb that fail to account for the unique financial circumstances of individuals. These one-size-fits-all solutions often recommend fixed percentages for savings, investments, and debt repayment without considering the complex interplay between these financial components. For example, traditional advice might suggest allocating a standard 20% of income to savings regardless of an individual's debt obligations or investment opportunities, leading to suboptimal financial outcomes.

A significant technical limitation of conventional financial guidance systems is their reliance on stated preferences rather than revealed preferences. Traditional systems typically gather information through questionnaires and direct inquiries about risk tolerance and financial goals, which often yield inaccurate data as individuals' self-reported behaviors frequently diverge from their actual financial decisions. This discrepancy creates a fundamental flaw in the data collection process, resulting in financial guidance that fails to align with users' true financial behaviors and preferences.

Furthermore, conventional financial guidance systems lack the technical capability to dynamically adjust to changing financial circumstances. These systems typically provide static recommendations that do not evolve as a user's financial situation changes, failing to account for unexpected expenses, income fluctuations, or shifts in financial goals. This inability to adapt in real-time significantly diminishes the effectiveness of the guidance provided, particularly in volatile economic environments where financial conditions can change rapidly.

Another technical challenge with existing approaches is the inefficient allocation of emergency savings. Traditional methods often recommend fixed amounts for emergency funds (e.g., three to six months of expenses) without considering the diminishing utility of additional savings beyond certain thresholds or the opportunity costs of maintaining excessive liquid assets instead of paying down high-interest debt or investing. This approach fails to optimize the balance between protection against financial shocks and wealth accumulation.

Additionally, conventional financial guidance systems typically operate in isolation from users' actual financial accounts and transaction data. This disconnection creates a technical barrier to providing truly personalized guidance, as these systems cannot automatically incorporate real-time financial data or seamlessly execute recommended financial actions. Users must manually implement recommendations across multiple financial platforms, increasing friction and reducing adherence to financial guidance.

The technical limitations of conventional approaches are further compounded by their inability to learn from and adapt to user behavior over time. Without sophisticated machine learning capabilities, traditional financial guidance systems cannot refine their recommendations based on the success or failure of previous advice, resulting in guidance that fails to improve as more data becomes available about the user's financial patterns and responses to recommendations.

The present disclosure addresses these challenges by providing a computer-implemented method for managing an individual's financial portfolio to optimize net wealth through a sophisticated data-driven approach. The system employs advanced data mining techniques to extract user preferences from actual financial behavior rather than relying on self-reported preferences, which often diverge from real financial decisions. By analyzing spending patterns, transaction histories, and financial behaviors, the system infers critical parameters such as risk tolerance and time preferences, creating a more accurate foundation for financial guidance than conventional questionnaire-based approaches.

The system's technical innovation lies in its ability to dynamically optimize emergency savings based on a utility curve that recognizes the diminishing returns of additional savings. Rather than recommending fixed amounts, the system calculates the optimal emergency savings threshold by analyzing the probability distribution of potential spending shocks specific to the user's financial history. This approach ensures that users maintain sufficient protection against financial emergencies while avoiding the opportunity cost of over-saving, which could otherwise be directed toward debt reduction or investments with higher returns.

Furthermore, the system employs a sophisticated reinforcement learning algorithm that continuously refines its financial guidance based on real-world feedback. This algorithm functions as an agent that observes the user's current financial state, takes actions by generating financial guidance, and receives rewards based on improvements in net wealth or progress toward financial goals. The system's policy for generating recommendations evolves over time as it learns from the outcomes of previous guidance, creating an increasingly personalized and effective financial strategy tailored to each user's unique circumstances and behaviors.

The system also incorporates strategic timing of financial guidance delivery, recognizing that users are more receptive to financial recommendations at certain points in their financial cycle, such as around paydays when they perceive greater financial flexibility. By analyzing spending patterns, the system identifies optimal moments to present guidance, significantly increasing the likelihood of user engagement and implementation of recommendations.

One key technical advantage of the system is its comprehensive approach to resource allocation, which prioritizes financial actions based on comparative returns. For example, the system recognizes that employer matching contributions to retirement accounts represent an immediate 100% return on investment, which typically exceeds the negative return from paying down even high-interest debt such as credit cards. This sophisticated comparative analysis enables the system to provide guidance that maximizes overall net wealth accumulation rather than focusing narrowly on debt reduction or savings in isolation.

Through this innovative combination of data mining, reinforcement learning, and dynamic optimization, the system provides accessible, personalized, and adaptive financial guidance that evolves with the user's changing financial circumstances and behaviors. The result is a significant improvement in net wealth accumulation—approximately 10% better than traditional financial advice approaches—by optimizing the allocation of resources among debt reduction, emergency savings, and investments based on each individual's unique financial situation and objectives.

FIG. 1 shows a networked computing environment 100 including a financial guidance platform or system 110 for managing an individual's financial portfolio to optimize net wealth. A user 102, while not an integral part of the system itself, interacts with the system through various client computing devices 104, which could range from desktop computers to mobile devices. Consistent with some examples, access to the financial guidance platform or system 110 is facilitated not only via a conventional web browser but may also be available through a dedicated native application designed to operate on a diverse array of client computing devices. The system is designed to provide personalized financial guidance by analyzing the user's actual financial behavior rather than relying on self-reported preferences, which often diverge from real financial decisions.

The financial guidance platform or system 110, as depicted in FIG. 1, is implemented to operate on a server 108; however, in alternative embodiments, the system could also be distributed and executed across multiple servers, each hosting various specialized components that contribute to the functionality of the system or platform. These components include a web server, which acts as the user interface component 112, facilitating user interaction; a data input/output component 114, responsible for the exchange of financial data with various external services; an API and integration component 116 that operates in connection with the data input/output component 114, ensuring seamless connectivity with these external services; a financial data analysis component 118, for scrutinizing financial information; a debt analysis component 120, focusing on debt-related data; a savings analysis component 122, for evaluating savings accounts and determining optimal emergency savings thresholds based on a utility curve that recognizes the diminishing returns of additional savings; an investment analysis component 124, which delves into investment details; a personalization engine 126, tailoring the experience to individual user needs; a data mining and behavior component 128, for understanding user financial behavior and extracting revealed preferences rather than stated preferences; a risk tolerance evaluation component 130, assessing the user's appetite for financial risk based on actual spending patterns rather than questionnaire responses; a time preference and goal-based planning component 132, aligning financial strategies with user goals and determining optimal timing for financial guidance delivery; a reinforcement learning component 134, for the continuous refinement of financial guidance through an agent-based approach that observes the user's financial state, takes actions, and receives rewards based on improvements in net wealth; a financial guidance generation component 136, which formulates specific financial advice; a visualization scenario component 138, offering graphical representations of financial projections; and a database management system 140, safeguarding the integrity and security of financial data.

The web server (user interface component) 112 serves as the user interface component of the system 112, providing a platform for the user 102 to input financial data, link to external services, view financial guidance, and interact with visual representations of financial trajectories. The web server (user interface component) 112 facilitates the user's engagement with the system 100, allowing for the adjustment of financial goals and the visualization of potential financial outcomes. The system is designed to present financial guidance at strategic times when users are more receptive to financial recommendations, such as around paydays when they perceive greater financial flexibility, thereby increasing the likelihood of user engagement and implementation of recommendations.

The data input/output component 114 manages the inflow and outflow of financial data. It is designed to obtain financial data directly from the user 102, who may interact with a user interface to input their financial details, including but not limited to income, expenses, debt obligations, and financial goals. Additionally, the data input/output component 114 is equipped to receive data from external data sources, thereby ensuring a comprehensive aggregation of the user's financial data. This component plays a crucial role in gathering the transaction data necessary for the system to infer user preferences regarding risk tolerance and time value of money, enabling the system to base its recommendations on revealed preferences rather than stated preferences, which often diverge significantly.

Complementing the data input/output component is the API and integration component 116, which serves as the communication nexus between the system 110 and various external financial institutions, data sources, and services. The API and integration component 116 provides the system 110 with the functionality to interface with external platforms, such as websites and data services that host bank accounts, savings accounts, investment accounts, and other financial instruments. Through the use of APIs, the API and integration component 116 establishes secure connections, enabling the system to access, retrieve, and periodically synchronize financial data from these external entities. The API and integration component 116 ensures that the system 110 is consistently updated with real-time financial data, facilitating accurate transaction execution and maintaining the system's relevance and efficacy in providing up-to-date financial guidance to the user. This continuous data synchronization is essential for the system's ability to adapt its recommendations as the user's financial situation evolves, allowing for dynamic optimization of emergency savings, debt repayment, and investment strategies based on the most current financial information. A detailed view of the API and integration component 116 is illustrated in FIG. 5 and described immediately below.

Figure 5:
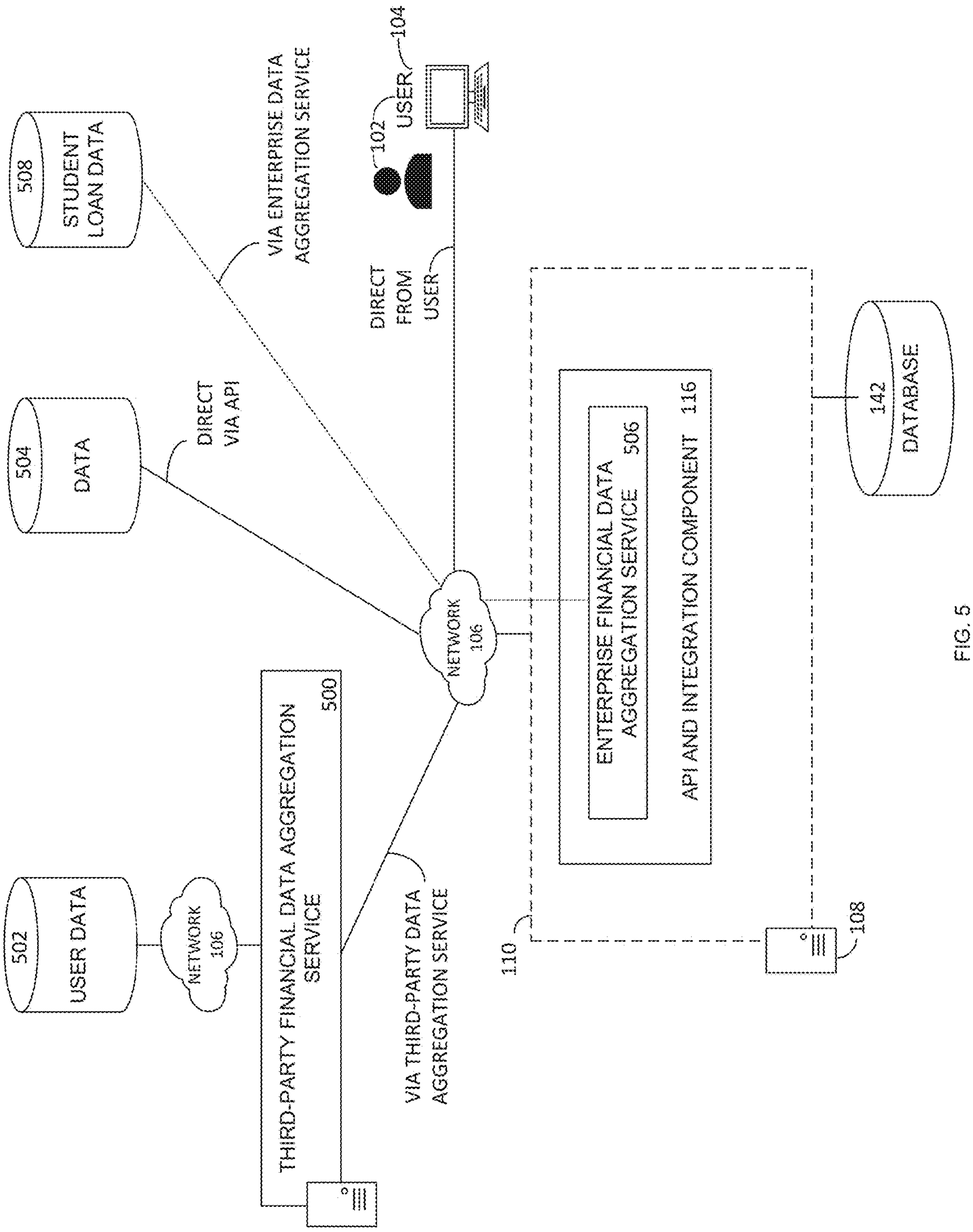
FIG. 5 illustrates a detailed view of the API and integration component 116, which operates to perform techniques for aggregating data sources consistent with some embodiments.

FIG. 5 illustrates a more detailed view of the API and integration component 116, which operates to perform techniques for aggregating data sources, including user data 502, data 504, and student loan data 508. The API and integration component 116 aggregates and synchronizes user data and financial data from a multitude of data sources to ensure that the system 110 offers current and personalized financial advice to the user 102. The system 110 uses various techniques employed by the API and integration component 116 to continuously obtain data for a user from diverse data sources, as depicted in FIG. 5. This comprehensive data collection is essential for the system to infer user preferences regarding risk tolerance and time value of money from actual financial behavior rather than relying on self-reported preferences, which often diverge significantly from real financial decisions.

Initially, during the setup phase, the API and integration component 116 acquires data directly from the user 102 through their client computing device 104. This data collection can occur via an operating system-native application or through a web browser interface. The user 102 is prompted to input essential financial details such as income, expenses, debt obligations, and financial goals. Accordingly, the data obtained directly from the user 102 serves as a foundational layer of data upon which the system 110 builds its analysis and recommendations. However, the system recognizes that this self-reported information may not fully capture the user's actual financial behaviors and preferences, which is why it supplements this data with transaction data from various financial accounts to reveal the user's true financial patterns.

Following the initial data entry by the user, the user 102 may be further prompted to provide information pertaining to their associated third-party financial entities, such as banking institutions, credit card providers, loan servicers, and investment accounts. This information may include the necessary authorization details and credentials that enable the API and integration component 116 to establish secure connections with these entities on behalf of the user. By granting the system 110 permission to access these external data sources, the user facilitates a comprehensive aggregation of their financial data, allowing the system to retrieve account balances, transaction histories, and other relevant financial information. This step allows the system 110 to perform a holistic analysis of the user's financial health and to generate personalized guidance that reflects the user's complete financial picture. The transaction data collected through these connections is particularly valuable for inferring the user's risk tolerance and time preferences, as it reveals their actual financial behaviors rather than their stated intentions.

With some embodiments, the API and integration component 116 may access a variety of different user data 502 via a third-party financial data aggregation service 500, such as Plaid®, Yodlee®, or another similar service. These third-party financial data aggregation services 500 operate as intermediaries that connect the financial guidance system 110 to various financial institutions where the user's financial accounts are held. By leveraging such services, the API and integration component 116 can securely and efficiently retrieve a wide range of financial data without the need for direct integration with each financial institution. This approach is similar to how users might connect their bank accounts to financial management tools, where they enter their credentials and the service securely retrieves their financial information.

The data accessed via the third-party data aggregation service 500 typically includes transaction data from bank accounts, which encompasses account balances, deposit and withdrawal histories, and detailed transaction descriptions. This transaction data provides a comprehensive view of the user's cash flow, enabling the system 110 to analyze spending patterns, categorize expenses, and identify recurring payments. Additionally, the aggregation service may also provide access to investment account information, such as holdings, performance data, and transaction histories, which are crucial for assessing the user's investment strategy and asset allocation. The system uses this transaction data to extract revealed preferences about the user's risk tolerance and time value of money, which are essential parameters for optimizing their financial portfolio. For example, if the system observes a user spending significant amounts at casinos or on lottery tickets, it can infer a higher risk tolerance without needing to explicitly ask the user about their comfort with financial risk.

Accordingly, the use of a third-party financial data aggregation service like Plaid® allows the system 110 to gather and synchronize financial data across multiple sources, ensuring that the financial advice provided to the user is based on the most current and complete financial information available. This integration facilitates the system's ability to offer personalized and dynamic financial guidance that is tailored to the user's unique financial situation, goals, and behavior. The system can identify optimal moments to present financial guidance, such as around paydays when users typically perceive greater financial flexibility and are more receptive to recommendations about saving or investing.

In addition to leveraging third-party financial data aggregation services, the API and integration component 116 may also integrate directly with one or more data sources via an API to obtain a wide variety of data. This direct integration approach enables the financial guidance system 110 to access specialized data sets that are essential for a comprehensive financial analysis. This is illustrated in FIG. 5 by the line connecting the system 110, via the network 106, to the data source labeled as "data" with reference 504. The system's ability to directly access and process data from various sources contributes to its capability to provide more accurate and personalized financial guidance than conventional approaches that rely on generic rules of thumb.

For instance, the API and integration component 116 can connect to market data providers to retrieve real-time financial market data, including stock prices, bond yields, and market indices. This market data is vital for assessing the current investment landscape and for making informed recommendations on asset allocation and investment strategies. Economic data, such as inflation rates, employment statistics, and gross domestic product (GDP) figures, can also be obtained directly through APIs from economic research firms or government databases. This economic data helps the system 110 to understand the broader economic environment and to anticipate potential market conditions that could impact the user's financial plan. By incorporating this market and economic data, the system can provide more sophisticated comparative analysis of potential returns from different allocation options, such as recognizing that employer matching contributions to retirement accounts represent an immediate 100% return on investment, which typically exceeds the negative return from paying down even high-interest debt.

Furthermore, the API and integration component 116 can interface with credit bureaus to access credit bureau data, which includes credit scores, credit reports, and credit histories. This information is crucial for evaluating the user's creditworthiness and for developing strategies for credit improvement and debt management. Other data that may be accessed directly via APIs include insurance policy details, real estate valuations, and tax information, which contribute to a more nuanced understanding of the user's financial assets and liabilities. The system uses this comprehensive data to calculate the probability distribution of potential spending shocks specific to the user's financial history, enabling it to determine the optimal emergency savings threshold that balances protection against financial emergencies with the opportunity cost of over-saving.

By integrating directly with these diverse data sources, the API and integration component 116 ensures that the financial guidance system 110 has access to a broad spectrum of financial information. This integration not only enriches the user's financial profile but also enhances the system's ability to deliver accurate, personalized, and actionable financial advice that takes into account the latest market trends, economic developments, and personal credit information. The system's ability to dynamically optimize emergency savings based on a utility curve that recognizes the diminishing returns of additional savings represents a significant advancement over conventional approaches that recommend fixed amounts regardless of individual circumstances.

Lastly, the API and integration component 116 may also utilize a custom or enterprise financial data aggregation service 506, which functions similarly to third-party services like Plaid® but is developed in-house specifically for the system 110. This bespoke service is particularly useful for accessing student loan data hosted by various student loan providers or banks. The enterprise service 506 is tailored to the unique requirements of the system 110, ensuring that data such as loan balances, interest rates, and payment histories are accurately captured and reflected in the user's financial profile. This specialized focus on student loan data is particularly important for implementing features related to the Secure Act 2.0, which allows employers to contribute to an employee's 401(k) based on documented student loan payments, even if the employee doesn't contribute to their 401(k) directly.

The enterprise financial data aggregation service 506, hosted on the server computer 108, is a proprietary solution developed specifically for the system 110. It is designed to gather and process student loan-related data from various providers, ensuring seamless integration into the user's financial profile. This service is engineered to interact directly with the databases and interfaces of financial institutions, extracting essential data points such as outstanding loan balances, applicable interest rates, and detailed payment histories. The service's ability to accurately track and verify student loan payments is crucial for enabling features like Student Loan Retirement Match (SLRM), where employers can contribute to an employee's retirement account based on their student loan payments.

To facilitate this, the enterprise financial data aggregation service 506 utilizes specialized algorithms and protocols tailored to navigate the diverse data structures and access controls of different loan providers. It sends authenticated requests to the financial institutions' servers, which respond with the relevant financial data upon validation. The exchange of data is conducted over secure, encrypted channels, safeguarding the confidentiality and integrity of the user's financial information. The service is designed to handle the complexities of various loan servicers' systems, ensuring reliable data retrieval even as these systems evolve or change over time.

Once the data is received, the service employs data normalization techniques to standardize the varied formats from multiple sources. This standardization ensures compatibility with the system 110's architecture and enables accurate analysis in conjunction with other financial data within the user's profile. The standardized data is then stored in the database management system 140, part of the server computer 108, providing a centralized repository for all financial data processed by the system. This normalized data is essential for the system's ability to determine which student loan payments are eligible for employer matching contributions under programs like SLRM, applying appropriate algorithms to verify payment eligibility according to regulatory requirements.

The enterprise financial data aggregation service 506 is also responsible for continuously monitoring for updates or changes to the user's financial data within the loan providers' systems. This ensures that the user's financial profile is always up-to-date, reflecting any new transactions or adjustments to loan terms promptly. Should there be changes in the loan providers' data presentation or API structures, the service is equipped with adaptive mechanisms to update its retrieval processes, ensuring uninterrupted data flow and maintaining the accuracy of the financial guidance provided by the system. The system is exploring the potential use of AI agents to automatically adapt to changes in loan servicer websites and data structures, which would represent a significant advancement over manual adaptation methods used by conventional systems.

In essence, the enterprise financial data aggregation service 506 acts as a dynamic and responsive element within the system 110, playing an important role in delivering comprehensive and current financial planning services. By automating the complex task of student loan data aggregation and ensuring the precision of the data, the service 110 significantly enhances the system's efficiency and the value of the financial insights offered to the user. This automation extends to the potential use of AI to screen-read loan statements and translate them into structured data, representing an innovative approach to data extraction that goes beyond conventional methods.

The API and integration component 116, through its various data collection methods, enables the system to implement a sophisticated reinforcement learning algorithm that continuously refines its financial guidance. This algorithm functions as an agent that observes the user's current financial state, takes actions by generating financial guidance, and receives rewards based on improvements in net wealth or progress toward financial goals. As the system collects more data about the user's financial behaviors and responses to recommendations, it continuously updates its policy for generating guidance, creating an increasingly personalized and effective financial strategy tailored to each user's unique circumstances.

The comprehensive data collection and integration capabilities of the API and integration component 116 are fundamental to the system's ability to provide financial guidance that results in approximately 10% better net wealth accumulation than traditional financial advice approaches. By gathering detailed transaction data, the system can extract revealed preferences rather than relying on stated preferences, recognize the optimal timing for financial guidance delivery, and dynamically optimize the allocation of resources among debt reduction, emergency savings, and investments based on each individual's unique financial situation and objectives.

FIG. 5 delineates the multifaceted approach of the API and integration component 116 in aggregating user and financial data. By combining direct user input, third-party aggregation services, direct API access, and custom enterprise services, the system 110 maintains a dynamic and comprehensive financial profile for each user. This integration is essential for the system's ability to provide real-time, tailored financial guidance that adapts to the user's changing financial landscape.

The financial data analysis component 118 analyzes the user's financial data, including income, expenses, debt obligations, savings, and investment details. This analysis allows for the system 110 to "understand" the user's financial situation and for generating accurate financial guidance.

The debt analysis component 120 calculates current balances, interest rates, and payment amounts for all debt obligations. This component assists in formulating strategies for effective debt reduction and management.

The savings analysis component 122 determines account balances and interest rates for savings accounts, establishing emergency fund targets and optimizing savings strategies. This component is essential in ensuring that the user maintains an adequate savings balance.

The investment analysis component 124 identifies types and details of investment accounts, including tax-advantaged accounts, and suggests diversification strategies. This component assists the user in making informed investment decisions that align with their financial goals.

The personalization engine 126 tailors the financial guidance plan based on the user's individual financial goals, circumstances, and risk tolerance. This engine ensures that the guidance provided aligns with the user's particular preferences and objectives.

The data mining and behavior component 128 employs data mining techniques to understand the user's financial behavior and preferences. This component also assesses potential financial shocks, providing a comprehensive view of the user's financial habits and potential risks.

Consistent with some embodiments, the data mining and behavior component 128 of the system 110 analyzes users' spending data to extract insights into their financial behaviors, such as the timing, nature, and amounts of their purchases. Utilizing advanced algorithms and machine learning techniques, the data mining and behavior component 128 refines its outputs to cater to the individualized financial needs of each user. Three key insights are derived from the spending data: the characteristics of past unexpected spending transactions, the user's risk tolerance, and their propensity to prioritize immediate needs over future planning.

To predict potential future unexpected expenses, the system 110 examines past transactions to understand the frequency and magnitude of unforeseen expenditures. This analysis enables the system 110 to recommend an optimal savings buffer, helping users prepare for similar scenarios in the future. In assessing risk tolerance, the system 110 evaluates the user's financial decisions and reactions to market fluctuations, which informs the creation of personalized recommendations for savings and investment strategies that align with the user's comfort level with financial uncertainty.

Furthermore, the system 110 delves into users' spending patterns to discern their tendencies toward immediate gratification versus long-term financial planning. By analyzing transaction data, the system 110 can determine whether a user is more inclined to spend readily or save for future goals. This insight allows the system 110 to align its financial guidance with the user's time preferences, ensuring that the advice provided supports both their current financial situation and their long-term objectives.

The component's 128 nuanced understanding of user behavior is achieved through a methodical approach that combines data mining and behavioral analysis. By considering various aspects of financial behavior, the system 110 crafts tailored recommendations that are not only responsive to immediate financial circumstances but also strategically designed to support the user's overarching financial aspirations. This personalized and strategic attunement to each user's unique financial landscape and preferences ensures that the system's advice is both relevant and impactful.

The risk tolerance evaluation component 130 evaluates the user's risk tolerance using a Constant Relative Risk Aversion (CRRA) utility function. This evaluation informs the investment strategies suggested by the system, ensuring they are appropriate for the user's risk profile.

The time preference and goal-based planning component 132 considers the user's time preferences and financial objectives, integrating user-defined financial targets into the financial plan. This component ensures that the user's long-term goals are factored into the financial guidance.

The reinforcement learning component 134 continuously improves financial guidance based on real-world feedback. This component adjusts the guidance in response to observed changes in the user's financial behavior and any encountered financial shocks, enhancing the accuracy and relevance of the guidance over time.

The financial guidance generation component 136 generates recommendations on debt reduction, savings optimization, and investment strategies that are tailored to individual preferences. This component provides a quantitative analysis for a balanced financial plan, aligning with the user's financial goals and risk tolerance.

The visualization scenario component 138 creates graphical charts and simulations that display projected net wealth growth and allow the user to interact with different financial scenarios. This component aids the user in visualizing the long-term effects of their financial decisions.

The database management system 140 ensures the confidentiality, integrity, and security of the user's financial data throughout the system. This system manages the storage of user profiles, financial data, historical transactions, and system-generated guidance for reference and analysis.

Consistent with some examples, the financial guidance system 110, as illustrated in FIG. 1, is designed to conduct a comprehensive analysis of an individual's financial situation, encompassing debt obligations, savings strategies, and investment accounts. The system employs advanced data mining techniques to extract user preferences from actual financial behavior rather than relying on self-reported preferences, which often diverge significantly from real financial decisions. This approach enables the system to infer critical parameters such as risk tolerance and time preferences from transaction data, providing a more accurate foundation for financial guidance than conventional questionnaire-based approaches.

The financial guidance system 110 features a debt analysis component 120 that evaluates each debt obligation associated with the user. The debt obligation component 120 calculates or determines the current balance, interest rate, and minimum payment requirement for each debt instrument or obligation, such as credit cards, student loans, mortgages, and personal loans. By aggregating this data, the system can prioritize debts based on interest rates and payment schedules, suggesting strategies for debt reduction that are optimized for interest savings and timely debt clearance. The system recognizes that the highest interest rate on a user's debt represents their effective "risk-free rate" from a net worth perspective, which influences how resources should be allocated between debt repayment and investments. For example, if a user has a student loan with an 8% interest rate, the system would consider this when evaluating whether investing in lower-yielding assets like Treasury bills would be beneficial.

For example, if a user has multiple credit card debts, the financial guidance system 110 will analyze the interest rates and balances of each card. It may recommend a strategy such as the debt avalanche method, where the user is advised to pay off debts starting with the highest interest rate while making minimum payments on others. This approach minimizes the total interest paid over time, leading to more efficient debt management. However, the system goes beyond conventional approaches by conducting a sophisticated comparative analysis of potential returns from different allocation options. It recognizes that employer matching contributions to retirement accounts represent an immediate 100% return on investment, which typically exceeds the negative return from paying down even high-interest debt like credit cards with interest rates of 20-30%. This comparative analysis enables the system to provide guidance that maximizes overall net wealth accumulation rather than focusing narrowly on debt reduction in isolation.

The savings analysis component 122 of the financial guidance system 110 determines the account balance and interest rate for each savings account held by the user. It then utilizes this information to assist the user in setting realistic savings goals and optimizing their savings strategies. The system 110 can suggest an emergency fund target based on the user's monthly expenses and risk factors, ensuring that the user maintains an adequate buffer for unforeseen circumstances. Rather than recommending fixed amounts for emergency funds (e.g., three to six months of expenses) as traditional approaches do, the system dynamically optimizes emergency savings based on a utility curve that recognizes the diminishing returns of additional savings beyond certain thresholds. The system calculates the optimal emergency savings threshold by analyzing the probability distribution of potential spending shocks specific to the user's financial history, ensuring sufficient protection while avoiding the opportunity cost of over-saving.

For instance, the system 110 may analyze the user's monthly income and expenses to determine a suitable emergency fund size, often recommended to be three to six months' worth of living expenses. It can then guide the user on how to incrementally build this fund while balancing other financial obligations. The system recognizes that the value of emergency savings follows a curve with diminishing returns—for example, increasing emergency savings from $0 to $1,000 provides significantly more protection against high-interest debt than increasing from $7,000 to $8,000. This understanding allows the system to dynamically adjust savings recommendations based on where the user falls on this utility curve, treating emergency savings as insurance against credit card debt and other high-interest borrowing that might be necessary in the event of unexpected expenses.

The investment analysis component 124 identifies the types and details of the user's investment accounts, including regular brokerage accounts and various tax-advantaged accounts such as 401(k)s, IRAs, and 529 plans. The system 110 assesses the user's current investment portfolio, considering factors such as asset allocation, risk level, and potential tax implications. It then provides recommendations on how to optimize the portfolio for tax efficiency and alignment with the user's investment goals and risk tolerance. The system employs a sophisticated comparative analysis of potential returns from different allocation options, recognizing that employer matching contributions to retirement accounts represent an immediate 100% return on investment, which typically exceeds the negative return from paying down even high-interest debt such as credit cards.

For example, the system 110 may suggest that a user with a high-risk tolerance and a long-term investment horizon allocate a larger portion of their portfolio to equities, which historically offer higher returns but come with increased volatility. Conversely, for a user nearing retirement, the system may recommend a shift towards more conservative fixed-income investments to preserve capital. The system's risk tolerance assessment is based on actual financial behavior rather than self-reported preferences, creating a more accurate foundation for investment recommendations. By analyzing transaction data, the system can extract revealed preferences about risk tolerance, such as identifying users who spend significant amounts at casinos or on lottery tickets as potentially having higher risk tolerance.

Accordingly, the system's integrated approach to analyzing debt, savings, and investments provides users with a holistic view of their financial health and actionable guidance to achieve their financial objectives. The system's recommendations are tailored to each user's unique financial situation, ensuring personalized and effective financial planning. This personalization is based on parameters extracted from actual financial behavior rather than self-reported preferences, which often diverge significantly from real financial decisions. The system also considers the relative position of users compared to population averages, using data from similar users when specific information is missing for an individual.

Consistent with some examples, the financial guidance system 110, as detailed in FIG. 1, includes advanced capabilities to assess potential spending shocks, evaluate risk tolerance, and determine time preferences for users. These capabilities are based on data mining of actual financial behavior rather than relying on self-reported preferences, which often diverge significantly from real financial decisions. This approach enables the system to provide more accurate and personalized financial guidance than conventional approaches that rely on questionnaires or generic rules of thumb.

The financial guidance system 110 incorporates a behavior analysis component 128 that simulates potential financial shocks—unexpected expenses that can significantly impact an individual's financial stability. This component 128 utilizes historical financial data and industry-standard reports to predict the likelihood and magnitude of such shocks. It then calculates the probability of experiencing a certain number of shocks within a given timeframe, allowing for the preparation of a financial buffer. The system recognizes that the value of emergency savings follows a curve with diminishing returns, enabling it to dynamically optimize emergency savings based on where the user falls on this utility curve. This approach ensures that users maintain sufficient protection against financial emergencies while avoiding the opportunity cost of over-saving.

For instance, the financial guidance system 110 may analyze a user's past medical expenses to estimate the probability of future healthcare-related financial shocks. If the user has a history of sporadic medical expenses, the system 110 will factor this into their financial planning, suggesting an appropriate amount to set aside for such unpredictable costs. The system treats emergency savings as insurance against credit card debt and other high-interest borrowing that might be necessary in the event of unexpected expenses. By analyzing the probability distribution of potential spending shocks specific to the user's financial history, the system can calculate the optimal emergency savings threshold that balances protection against financial emergencies with the opportunity cost of over-saving.

The risk tolerance evaluation component 130 of the system 110 employs a Constant Relative Risk Aversion (CRRA) utility function to measure a user's comfort with financial risks. This function is used to determine the user's propensity for investing in riskier assets versus risk-free assets. The system 110 personalizes the utility function based on the user's financial behavior, such as their reaction to market fluctuations or their investment choices, to align investment strategies with the user's risk tolerance. The CRRA utility function provides a comparative measure of utility between investing in risky and riskless assets, allowing the system to modulate recommendations based on the user's risk tolerance. The system can adjust the parameters of the utility function to reflect changes in risk tolerance, which tends to decrease as individuals age or experience significant life changes.

For example, a user who has consistently chosen high-yield bonds over more volatile stocks may be identified as having a lower risk tolerance. The system 110 will then recommend a portfolio that leans towards more stable investments while still providing opportunities for growth within the user's comfort zone. Similarly, if the system observes a user spending significant amounts at casinos or on lottery tickets, it can infer a higher risk tolerance without needing to explicitly ask the user about their comfort with financial risk. This approach of extracting revealed preferences from transaction data provides a more accurate assessment of risk tolerance than conventional questionnaire-based methods, which often yield inaccurate data as individuals' self-reported behaviors frequently diverge from their actual financial decisions.

The time preference and goal-based planning component 132 of the system 110 considers the user's financial objectives and the time horizon for achieving them. It employs quasi-hyperbolic discounting to prioritize immediate financial goals over future ones, reflecting the common human behavior of valuing present rewards more than future ones. This allows the system 110 to tailor financial plans that match the user's short-term and long-term financial aspirations. The system employs quasi-hyperbolic discounting to model how users value present versus future rewards, recognizing that individuals typically place higher value on immediate rewards compared to delayed ones. This approach allows the system to develop allocation strategies that align with the user's desired time horizons while accounting for their natural tendency toward present bias.

For instance, if a user expresses a desire to purchase a home within the next five years, the system will prioritize saving for a down payment over more distant goals, such as retirement savings. It will calculate the optimal savings rate and investment strategy to help the user achieve this goal within the desired timeframe. The system also identifies optimal moments to present financial guidance, such as around paydays when users typically perceive greater financial flexibility and are more receptive to recommendations about saving or investing. This strategic timing of financial guidance delivery significantly increases the likelihood of user engagement and implementation of recommendations.

Accordingly, the financial guidance system 110 is designed to provide a comprehensive and personalized financial analysis by understanding and adapting to individual user behaviors and preferences. Through advanced algorithms and predictive modeling, the system offers tailored recommendations that help users navigate their financial journey with confidence, taking into account their unique circumstances, risk tolerance, and time preferences. The system's ability to extract revealed preferences from transaction data, recognize optimal timing for guidance delivery, and dynamically optimize resource allocation results in approximately 10% better net wealth accumulation than traditional financial advice approaches.

Consistent with some examples, the financial guidance system 110 is designed with a goal-based planning component 132 that integrates user-defined financial targets into the financial planning process. This component 132 allows users to input their financial goals, such as saving for a down payment on a house, funding a child's education, or preparing for retirement. The system 110 then adjusts its financial guidance to ensure that these goals are central to the user's financial plan. The system employs quasi-hyperbolic discounting to model how users value present versus future rewards, allowing it to develop allocation strategies that align with the user's desired time horizons while accounting for their natural tendency toward present bias.

For example, a user may set a goal to save $50,000 for a down payment on a home within the next five years. The system 110 will incorporate this goal into its analysis by introducing a constraint that ensures the user's savings balance meets or exceeds this amount by the specified time. The system 110 will then provide a tailored savings and investment strategy that accounts for this goal, adjusting recommendations for asset allocation, savings contributions, and debt repayment to facilitate the achievement of the target. The system recognizes that the value of emergency savings follows a curve with diminishing returns, enabling it to dynamically optimize emergency savings based on where the user falls on this utility curve while still working toward the user's specific financial goals.

The financial guidance system 110 employs an algorithm that modifies the optimization problem to find the best financial strategy while satisfying the user-defined constraints. It takes into account the user's current financial situation, including income, expenses, existing savings, and investment preferences, to create a feasible and effective plan to reach the set goals. The system employs a sophisticated comparative analysis of potential returns from different allocation options, such as recognizing that employer matching contributions to retirement accounts represent an immediate 100% return on investment, which typically exceeds the negative return from paying down even high-interest debt like credit cards with interest rates of 20-30%.

For instance, if the user's current savings rate is insufficient to meet the down payment goal within the desired timeframe, the system may suggest increasing the savings rate, reducing discretionary spending, or reallocating investments to more growth-oriented assets to accumulate the required funds more quickly. The system's recommendations are based on parameters extracted from actual financial behavior rather than self-reported preferences, creating a more accurate foundation for financial guidance. When specific data is missing for an individual, the system uses the average parameters calculated for people with similar observable characteristics, such as assets, liabilities, age, and location, until better data becomes available.

The system 110 also features a visualization component 138 that presents the user's financial trajectory in relation to their goals. This interactive tool allows users to see how different financial decisions and changes in their plan can impact the likelihood of achieving their goals. It provides a clear and intuitive understanding of the long-term effects of their financial choices on their net wealth accumulation. The system is exploring the potential to enhance this component with a conversational interface using a fine-tuned AI model that could explain why specific guidance was provided, offering deeper insights than static graphs alone. This conversational capability would help users understand the reasoning behind recommendations and explore additional layers of information about their financial plan.

For example, the visualization component 138 may display a graph showing the projected growth of the user's savings over time, with milestones indicating when key financial goals are expected to be met. Users can interact with this graph to explore different scenarios, such as increasing monthly savings contributions or delaying a large purchase, to observe the potential impact on their financial goals. Various examples of the different types of visual scenarios generated by the system 100 are provided in the appendix that follows. The system also identifies optimal moments to present financial guidance, such as around paydays when users typically perceive greater financial flexibility and are more receptive to recommendations about saving or investing.

Accordingly, the goal-based methodology of the financial guidance system 110 differentiates it from traditional financial planning tools. By allowing users to define and prioritize their financial goals, the system offers a customized and dynamic approach to financial planning that is both user-centric and adaptable to changing circumstances. The ability of the system 110 to align financial strategies with user goals, coupled with its visualization tools, empowers users to make informed decisions and actively work towards their desired financial future. The system's reinforcement learning algorithm functions as an agent that observes the user's current financial state, takes actions by generating financial guidance, and receives rewards based on improvements in net wealth or progress toward financial goals, creating an increasingly personalized and effective financial strategy over time.

Figure 2:
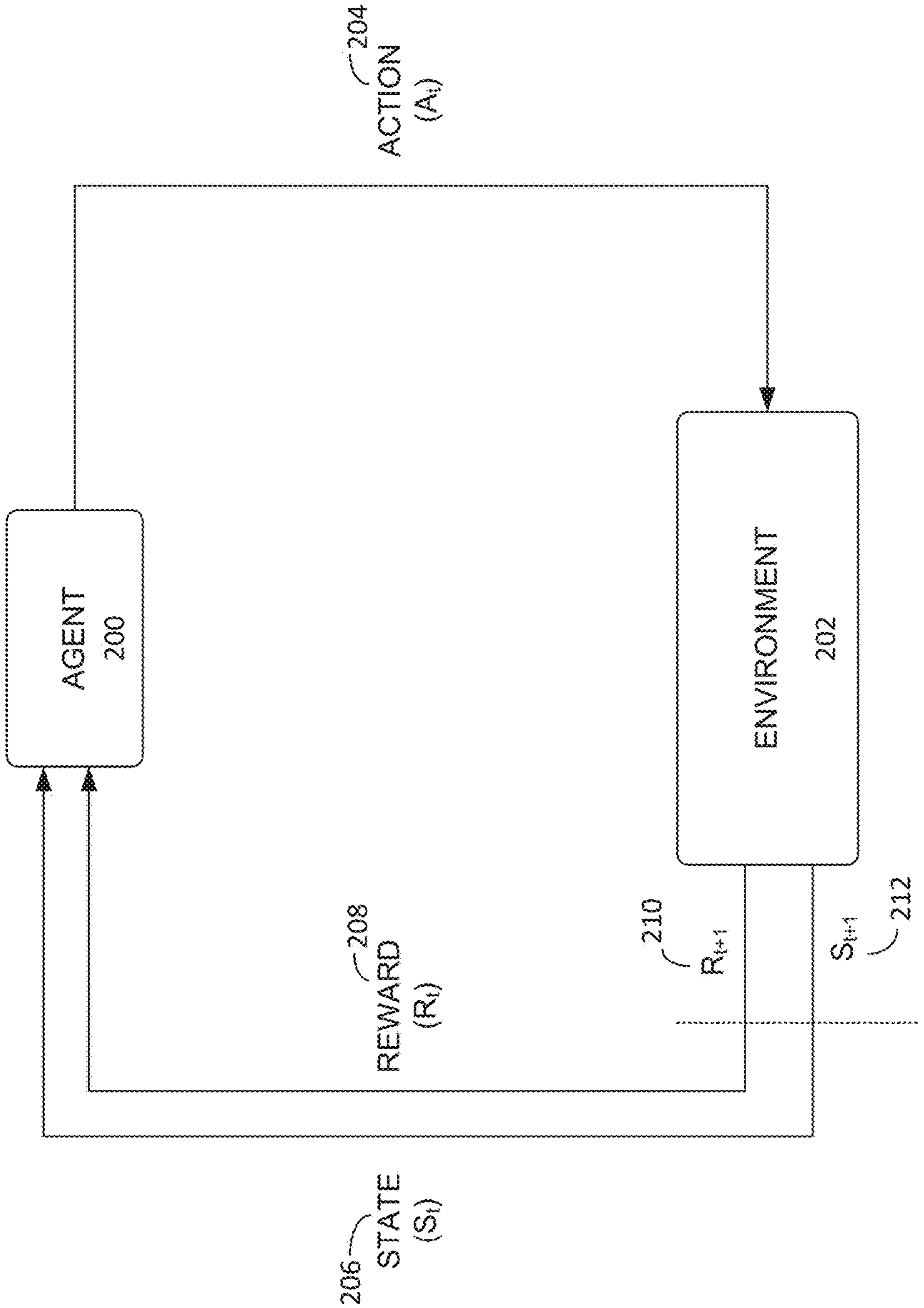
FIG. 2 illustrates a machine learning algorithm, and more precisely a reinforcement learning algorithm, via which the financial guidance platform or system refines its decision-making policy to optimize the user's financial portfolio over time.

Consistent with some examples, the financial guidance system 110 incorporates an advanced reinforcement learning model to continuously refine and enhance its financial guidance, representing a significant improvement over conventional financial advisory systems. This model is depicted in FIG. 2, which illustrates the key components of the reinforcement learning framework as applied within the context of the system. FIG. 2 presents a schematic representation of a reinforcement learning algorithm within the financial guidance system 110. The diagram identifies the primary components of the reinforcement learning model, including the Agent 200, the Environment 202, the State 206, and the Reward 208. Each component plays a critical role in the iterative learning process that enables the system to provide dynamic and personalized financial advice that evolves with the user's changing financial circumstances, a capability that traditional financial guidance systems fundamentally lack.

Within the financial guidance system 110, the Agent 200 represents the decision-making entity, which, in this case, is the sophisticated algorithm or software module responsible for generating financial guidance. Unlike conventional financial advisory systems that rely on static rules of thumb or generic advice, the role of the Agent 200 is to dynamically interact with the Environment 202, observe the current State 206, and take Actions 204 that aim to optimize the user's financial portfolio based on the feedback received in the form of Rewards 208. This approach allows the system to extract revealed preferences from transaction data rather than relying on self-reported preferences, which often diverge significantly from users' actual financial behaviors.

The Environment 202 encompasses the comprehensive financial landscape in which the user operates. It includes various financial institutions, market conditions, economic indicators, and the user's personal financial data. The Environment 202 is the external context with which the Agent 200 interacts to make informed decisions. Unlike traditional financial guidance systems that operate with limited awareness of the user's complete financial ecosystem, the reinforcement learning model continuously monitors and adapts to changes in this environment, ensuring that recommendations remain relevant even as financial markets, regulations, and the user's personal circumstances evolve.

The State 206 refers to the user's current financial situation at any given time. It is a comprehensive snapshot that includes data such as income, expenses, debt levels, savings, investment portfolio, and other relevant financial information. The State 206 provides the context within which the Agent 200 must decide which Action 204 to take. Unlike conventional approaches that rely on periodic manual updates of financial information, the system continuously updates its understanding of the user's financial state, enabling it to provide timely and relevant guidance that reflects the user's current circumstances rather than an outdated financial snapshot.

The Reward 208 is the sophisticated feedback mechanism that evaluates the effectiveness of the Actions 204 of the Agent 200. In the financial context, the Reward 208 could be an improvement in net wealth, successful debt reduction, or progress towards a financial goal. The Reward 208 informs the Agent 200 about the success of its Actions 204 and guides its future decision-making. This feedback loop represents a fundamental improvement over traditional financial guidance systems, which typically provide static recommendations without the ability to learn from their effectiveness or adapt based on outcomes.

The reinforcement learning algorithm operates through a sophisticated cycle of interactions between the Agent 200 and the Environment 202. The Agent 200 observes the current State 206 and takes an Action 204 based on its current policy or strategy. This Action 204 is executed within the Environment 202, which then transitions to a new State 212 and provides a Reward 210 to the Agent 200 based on the outcome of the Action 204. For example, the Agent 200 may recommend reallocating funds from a low-interest savings account to pay off high-interest credit card debt. Once the user acts on this recommendation, the Environment 202 changes (the debt decreases, and the savings balance is adjusted), and the system 110 evaluates the impact on the user's financial health. If the net wealth improves, the Reward 208 is positive, reinforcing the decision. Conversely, if the Action 204 does not yield optimal results, the Reward 208 is less favorable, prompting the Agent 200 to adjust its strategy. This dynamic learning process enables the system to provide increasingly effective financial guidance over time, a capability that traditional financial advisory systems fundamentally lack.

Over time, through repeated cycles of Actions and feedback, the Agent 200 learns a policy that maximizes cumulative Rewards 208, equating to achieving the best financial outcomes for the user. The reinforcement learning algorithm continuously refines its policy to adapt to changes in the user's financial situation and the broader economic Environment 202, ensuring that the financial guidance remains relevant and effective. This approach yields approximately 10% better net wealth accumulation than traditional financial advice approaches by extracting revealed preferences from transaction data, recognizing optimal timing for guidance delivery, and dynamically optimizing resource allocation based on each individual's unique financial situation and objectives.

For instance, while conventional financial advice might recommend a standard approach of paying down high-interest debt before making other investments, the reinforcement learning system can recognize that employer matching contributions to retirement accounts represent an immediate 100% return on investment, which typically exceeds the negative return from paying down even high-interest debt like credit cards with interest rates of 20-30%. By learning from actual financial outcomes rather than following rigid rules, the system can provide more nuanced and effective guidance that maximizes overall financial benefit.

Another example of the system's superior approach is its ability to optimize emergency savings based on a utility curve that recognizes the diminishing returns of additional savings. Rather than recommending fixed amounts for emergency funds (e.g., three to six months of expenses) as traditional approaches do, the system calculates the optimal emergency savings threshold by analyzing the probability distribution of potential spending shocks specific to the user's financial history. The system recognizes that the value of emergency savings follows a curve with diminishing returns—for example, increasing emergency savings from $0 to $1,000 provides significantly more protection against high-interest debt than increasing from $7,000 to $8,000. This understanding allows the system to dynamically adjust savings recommendations based on where the user falls on this utility curve.

Consequently, the integration of reinforcement learning into the financial guidance system 110 allows for a dynamic and responsive approach to personal financial management that represents a significant advancement over conventional financial advisory methods. By continuously learning from real-world feedback and adjusting its recommendations, the system 110 provides users with financial guidance that evolves with their financial behavior and the changing economic landscape. This adaptive approach results in more effective financial outcomes, as the system becomes increasingly attuned to the user's specific financial situation, preferences, and goals over time.

Machine and Software Architecture

Figure 3:
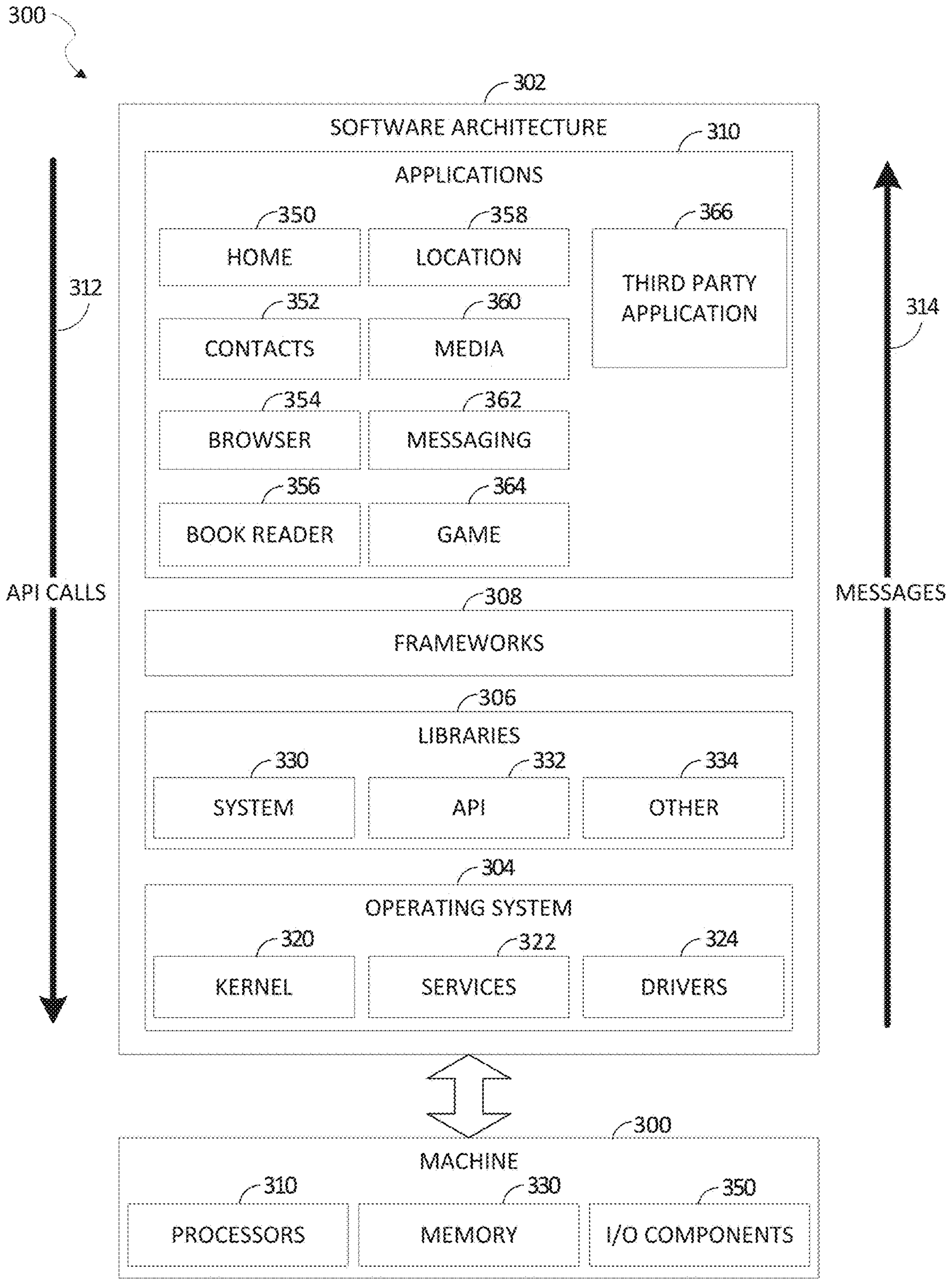
FIG. 3 is a block diagram illustrating a software architecture, which can be installed on any of a variety of computing devices to perform methods consistent with those described herein.

FIG. 3 is a block diagram 300 illustrating a software architecture 302, which can be installed on any of a variety of computing devices to perform methods consistent with those described herein. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 402 includes layers such as an operating system 304, libraries 306, frameworks 308, and applications 310. Operationally, the applications 310 invoke API calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionality. The services 322 can provide other common services for the other software layers. The drivers 324 are responsible for controlling or interfacing with the underlying hardware, according to some embodiments. For instance, the drivers 324 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310, according to some embodiments. For example, the frameworks 308 provide various GUI functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. According to some embodiments, the applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 to facilitate functionality described herein.

Figure 4:
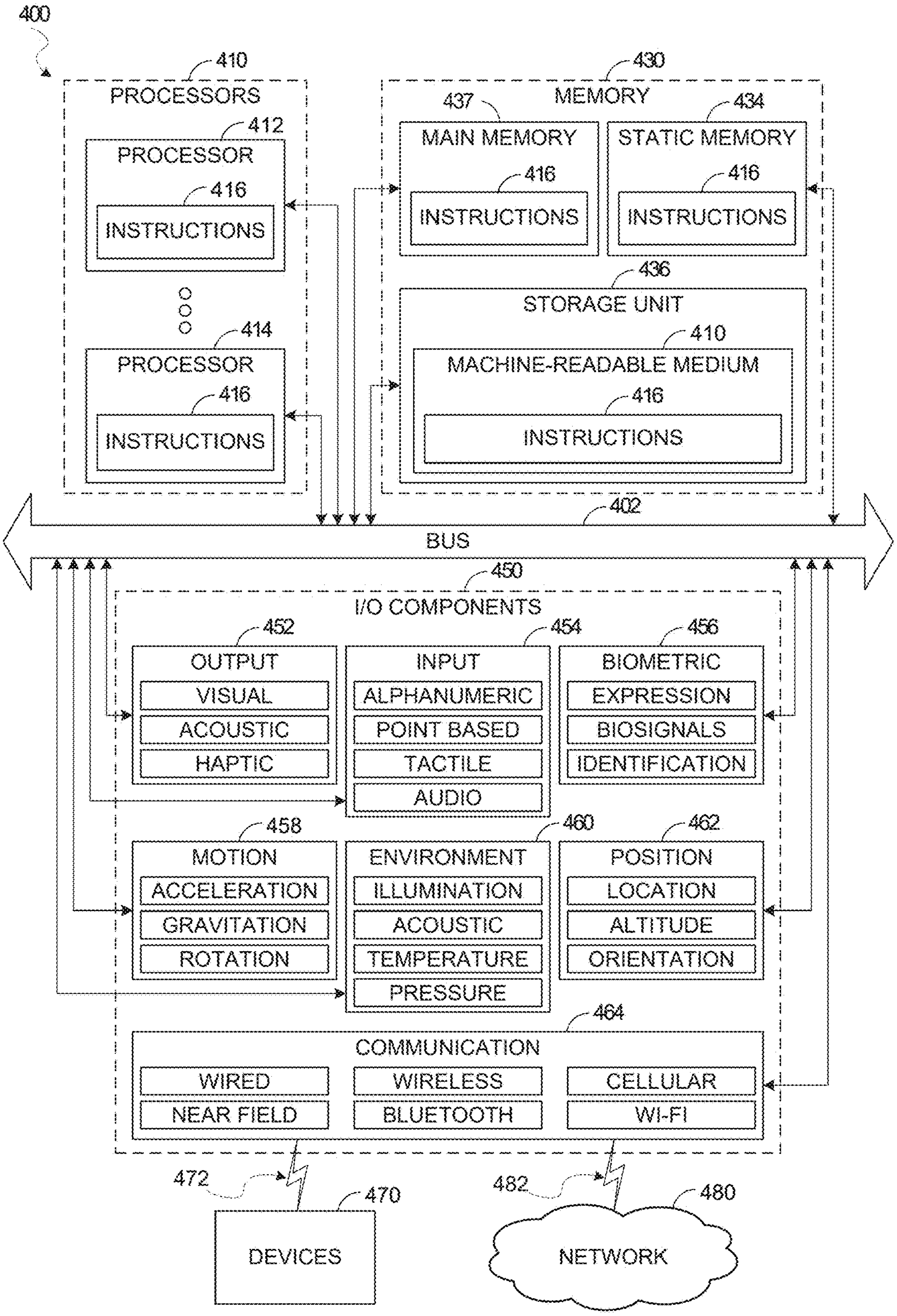
FIG. 4 illustrates a diagrammatic representation of a machine in the form of a computer system (e.g., a server computer) within which a set of instructions may be executed for causing the machine to perform any one or more of the methodologies discussed herein, according to an example embodiment.

FIG. 4 illustrates a diagrammatic representation of a machine 400 in the form of a computer system within which a set of instructions may be executed for causing the machine to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example the instructions 416 may cause the machine 400 to execute any one of the methods or algorithmic techniques described herein. Additionally, or alternatively, the instructions 416 may implement any one of the systems described herein. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions contemporaneously. Although FIG. 4 shows multiple processors 410, the machine 400 may include a single processor with a single core, a single processor with multiple cores (e.g., a multi-core processor), multiple processors with a single core, multiple processors with multiples cores, or any combination thereof.

The memory 430 may include a main memory 432, a static memory 434, and a storage unit 436, all accessible to the processors 410 such as via the bus 402. The main memory 430, the static memory 434, and storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion and the grouping is in no way limiting. In various example embodiments, the I/O components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., a peripheral device coupled via a USB).

Moreover, the communication components 464 may detect identifiers or include components operable to detect identifiers. For example, the communication components 464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 430, 432, 434, and/or memory of the processor(s) 410) and/or storage unit 436 may store one or more sets of instructions and data structures (e.g., software) embodying or utilized by any one or more of the methodologies or functions described herein. These instructions (e.g., the instructions 416), when executed by processor(s) 410, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 480 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" are intended to mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method for managing an individual's financial portfolio to optimize net wealth, the method comprising:

- receiving, by a processor, financial data associated with a user, wherein the financial data includes at least information regarding income, expenses, debt obligations, savings account balances, investment account details, and historical financial transactions;
- analyzing, by the processor, the received financial data to determine a current financial state of the user, wherein the analysis includes:
  - calculating a current balance, interest rate, and minimum payment requirement for each identified debt obligation;
  - determining an account balance and interest rate for each identified savings account;
  - identifying types and details of investment accounts, including tax-advantaged investment accounts;
- personalizing, by the processor, a financial guidance plan based on financial goals of the user, circumstances, and risk tolerance, wherein the personalization includes:
  - employing data mining techniques to understand financial behavior and preferences of the user;
  - assessing potential financial shocks and evaluating the risk tolerance of the user using a Constant Relative Risk Aversion (CRRA) utility function;
  - considering time preferences and financial objectives of the user to develop a goal-based financial plan;
  - generating, by the processor, tailored financial guidance for the user, wherein the financial guidance includes specific recommendations on debt reduction, savings optimization, and investment strategies;
  - implementing, by the processor, a reinforcement learning algorithm to continuously improve the financial guidance based on real-world feedback, wherein the algorithm adjusts the financial guidance in response to observed changes in the individual's financial behavior, adherence to the guidance, and any encountered financial shocks;
  - providing, by the processor, tailored financial guidance to the user through a user interface, enabling the user to visualize their financial trajectory and understand the impact of the guidance on achieving financial goals;
  - adjusting, by the processor, the financial guidance plan based on one or more user-inputted financial goals, the adjusting comprising:
    - receiving, via the user interface, a user-defined financial target, the user-defined financial target comprising a desired savings balance to be achieved by a specified future date;
    - incorporating, by the processor, the user-defined financial target into the financial guidance plan as a constraint to be achieved;
    - modifying, by the processor, the specific recommendations on debt reduction, savings optimization, and investment strategies such that the financial guidance plan aligns with the user-defined financial target;
    - recalculating, by the processor, the tailored financial guidance, the recalculated tailored financial guidance reflecting the user-defined financial target;
    - updating, by the processor, the user interface, the updated user interface displaying an adjusted financial trajectory; and
    - refining, by the reinforcement learning algorithm, the financial guidance based on progress toward the user-defined financial target and
  - one or more subsequent adjustments to the one or more user-inputted financial goals over time;
  - wherein the method results in a net wealth improvement for the individual by optimizing the allocation of resources among debt reduction, savings, and investments based on the individual's personalized financial plan.

2. The computer-implemented method of claim 1, wherein the method further comprises:

presenting, by the processor through the user interface, a visual representation of the individual's financial trajectory, wherein the visual representation includes:

generating a graphical chart that displays projected growth of the individual's net wealth over time based on the tailored financial guidance;

illustrating potential outcomes of different financial scenarios by varying parameters of debt repayment rates, savings contributions, and investment returns within the graphical chart;

enabling the individual to interact with the graphical chart to simulate changes in financial behavior, such as increased savings contributions or accelerated debt repayments, and observing the impact on the projected net wealth growth;

updating the graphical chart in real-time as the individual inputs new financial data or modifies financial goals through the user interface;

wherein the visual representation aids the individual in making informed decisions by providing a clear and intuitive understanding of long-term effects of their financial choices on their net wealth accumulation.

3. A computer-implemented method for optimizing a user's financial portfolio through adaptive guidance, the method comprising:

receiving, by a processor, financial data associated with a user, wherein the financial data includes information regarding income, expenses, debt obligations, savings account balances, investment account details, and historical financial transactions;

analyzing, by the processor, the received financial data to determine a current financial state of the user;

extracting, by the processor using data mining techniques, user preferences from the financial data, wherein the user preferences include:

risk tolerance parameters inferred from the user's spending patterns and financial behavior;

time preferences determined from the user's historical financial decisions; and emergency savings requirements based on the user's historical spending shocks;

generating, by the processor, a personalized financial guidance plan based on the extracted user preferences and the current financial state, wherein the personalized financial guidance plan includes specific recommendations for allocating available funds among debt reduction, emergency savings, and investments to optimize the user's net wealth;

implementing, by the processor, a reinforcement learning algorithm to continuously refine the financial guidance plan based on:

observed changes in the user's financial behavior;

feedback on adherence to previous guidance; and updated financial data reflecting the user's current financial state;

providing, by the processor, the personalized financial guidance plan to the user through a user interface that enables the user to visualize their financial trajectory and understand the impact of following the guidance on achieving financial goals;

adjusting, by the processor, the personalized financial guidance plan based on one or more user-inputted financial goals, the adjusting comprising:

receiving, via the user interface, a user-defined financial target, the user-defined financial target comprising a desired savings balance to be achieved by a specified future date;

incorporating, by the processor, the user-defined financial target into the personalized financial guidance plan as a constraint to be achieved;

modifying, by the processor, the specific recommendations for allocating available funds among debt reduction, emergency savings, and investments such that the personalized financial guidance plan aligns with the user-defined financial target;

recalculating, by the processor, the tailored financial guidance, the recalculated tailored financial guidance reflecting the user-defined financial target;

updating, by the processor, the user interface, the updated user interface displaying an adjusted financial trajectory; and refining, by the reinforcement learning algorithm, the personalized financial guidance plan based on progress toward the user-defined financial target and one or more subsequent adjustments to the one or more user-inputted financial goals over time;

wherein the method results in a net wealth improvement for the user by dynamically optimizing the allocation of resources based on the user's evolving financial situation and preferences.

4. The computer-implemented method of claim 3, wherein extracting user preferences from the financial data further comprises:

analyzing the user's spending patterns to determine timing of financial guidance delivery, wherein the timing is determined based on periods when the user is more likely to allocate funds for financial goals based on historical spending behavior; and dynamically adjusting the timing of financial guidance delivery based on observed changes in the user's spending patterns.

5. The computer-implemented method of claim 3, wherein the method further comprises:

determining an optimal emergency savings amount for the user by:

calculating a probability distribution of potential spending shocks based on the user's historical financial data;

evaluating a utility curve representing the diminishing returns of additional emergency savings; and identifying a point on the utility curve where the marginal benefit of additional emergency savings equals the opportunity cost of not allocating those funds to debt reduction or investments.

6. The computer-implemented method of claim 3, wherein generating the personalized financial guidance plan comprises:

prioritizing allocation of available funds between:

contributing to a 401(k) or other retirement account to maximize employer matching contributions;

paying down high-interest debt; and building emergency savings;

wherein the prioritization is based on a comparative analysis of expected returns from each allocation option, including treating employer matching contributions as an immediate return on investment.

7. The computer-implemented method of claim 3, wherein the method further comprises:

enabling the user to input a new financial target through the user interface;

recalculating the personalized financial guidance plan to incorporate the new financial target;

displaying, through the user interface, a visual representation showing the impact of the new financial target on the user's projected financial trajectory; and providing recommendations for adjusting current financial behaviors to achieve the new financial target.

8. The computer-implemented method of claim 3, wherein the reinforcement learning algorithm comprises:

an agent that observes the current financial state of the user and takes actions by generating financial guidance;

an environment that represents the user's financial landscape including financial institutions, market conditions, and the user's financial data;

a reward function that evaluates the effectiveness of the financial guidance based on improvements in net wealth, debt reduction, or progress towards financial goals; and a policy that is continuously updated based on the rewards received to optimize future financial guidance.

9. A system for optimizing a user's financial portfolio through adaptive guidance, the system comprising:

at least one processor; and at least one memory storage device storing executable instructions thereon, which, when executed by the at least one processor, cause the system to perform operations comprising:

receiving, by a processor, financial data associated with a user, wherein the financial data includes information regarding income, expenses, debt obligations, savings account balances, investment account details, and historical financial transactions;

analyzing, by the processor, the received financial data to determine a current financial state of the user;

extracting, by the processor using data mining techniques, user preferences from the financial data, wherein the user preferences include:

risk tolerance parameters inferred from the user's spending patterns and financial behavior;

time preferences determined from the user's historical financial decisions; and emergency savings requirements based on the user's historical spending shocks;

generating, by the processor, a personalized financial guidance plan based on the extracted user preferences and the current financial state, wherein the personalized financial guidance plan includes specific recommendations for allocating available funds among debt reduction, emergency savings, and investments to optimize the user's net wealth;

implementing, by the processor, a reinforcement learning algorithm to continuously refine the financial guidance plan based on:

observed changes in the user's financial behavior;

feedback on adherence to previous guidance; and updated financial data reflecting the user's current financial state;

providing, by the processor, the personalized financial guidance plan to the user through a user interface that enables the user to visualize their financial trajectory and understand the impact of following the guidance on achieving financial goals;

adjusting, by the processor, the personalized financial guidance plan based on one or more user-inputted financial goals. the adjusting comprising:

receiving, via the user interface, a user-defined financial target, the user-defined financial target comprising a desired savings balance to be achieved by a specified future date:

incorporating, by the processor, the user-defined financial target into the personalized financial guidance plan as a constraint to be achieved;

modifying, by the processor, the specific recommendations for allocating available funds among debt reduction, emergency savings, and investments such that the personalized financial guidance plan aligns with the user-defined financial target;

recalculating, by the processor, the tailored financial guidance, the recalculated tailored financial guidance reflecting the user-defined financial target;

updating, by the processor, the user interface, the updated user interface displaying an adjusted financial trajectory; and refining, by the reinforcement learning algorithm, the personalized financial guidance plan based on progress toward the user-defined financial target and one or more subsequent adjustments to the one or more user-inputted financial goals over time;

wherein execution of the operations results in a net wealth improvement for the user by dynamically optimizing the allocation of resources based on the user's evolving financial situation and preferences.

10. The system of claim 9, wherein extracting user preferences from the financial data further comprises:

analyzing the user's spending patterns to determine timing of financial guidance delivery, wherein the timing is determined based on periods when the user is more likely to allocate funds for financial goals based on historical spending behavior; and dynamically adjusting the timing of financial guidance delivery based on observed changes in the user's spending patterns.

11. The system of claim 9, wherein the method further comprises:

determining an optimal emergency savings amount for the user by:

calculating a probability distribution of potential spending shocks based on the user's historical financial data;

evaluating a utility curve representing the diminishing returns of additional emergency savings; and identifying a point on the utility curve where the marginal benefit of additional emergency savings equals the opportunity cost of not allocating those funds to debt reduction or investments.

12. The system of claim 9, wherein generating the personalized financial guidance plan comprises:

prioritizing allocation of available funds between:

contributing to a 401(k) or other retirement account to maximize employer matching contributions;

paying down high-interest debt; and building emergency savings;

wherein the prioritization is based on a comparative analysis of expected returns from each allocation option, including treating employer matching contributions as an immediate return on investment.

13. The system of claim 9, wherein the operations further comprise:

enabling the user to input a new financial target through the user interface;

recalculating the personalized financial guidance plan to incorporate the new financial target;

displaying, through the user interface, a visual representation showing the impact of the new financial target on the user's projected financial trajectory; and providing recommendations for adjusting current financial behaviors to achieve the new financial target.

14. The system of claim 9, wherein the reinforcement learning algorithm comprises:

an agent that observes the current financial state of the user and takes actions by generating financial guidance;

an environment that represents the user's financial landscape including financial institutions, market conditions, and the user's financial data;

a reward function that evaluates the effectiveness of the financial guidance based on improvements in net wealth, debt reduction, or progress towards financial goals; and a policy that is continuously updated based on the rewards received to optimize future financial guidance.

* * * * *